US006305303B1

(12) United States Patent
Wright et al.

(10) Patent No.: US 6,305,303 B1
(45) Date of Patent: Oct. 23, 2001

(54) HIGH-SPEED TRANSPLANTER FOR SEEDLINGS ATTACHED TO TAPE

(75) Inventors: Malcolm E. Wright, Baton Rouge; Leslie L. Davis, Prairieville; Brent C. Gros, Slidell; Stephen C. LeJeune, Gonzales, all of LA (US); William C. Mercer, Houston, TX (US)

(73) Assignee: Board of Supervisors of Louisana State University and Agriculture and Mechnical College, Baton Rouge, LA (US)

( * ) Notice: Subject to any disclaimer, the term of this patent is extended or adjusted under 35 U.S.C. 154(b) by 0 days.

(21) Appl. No.: 09/307,500

(22) Filed: May 7, 1999

(51) Int. Cl.[7] .................................................. A01C 11/02
(52) U.S. Cl. ........................... 111/100; 111/903; 111/114
(58) Field of Search ..................................... 111/100, 101, 111/102, 103, 109, 111, 112, 113, 114, 199, 903; 405/176; 47/56

(56) References Cited

U.S. PATENT DOCUMENTS

| | | |
|---|---|---|
| 1,750,054 | 3/1930 | Rosso . |
| 2,924,186 | 2/1960 | Landeen ..................... 111/5 |
| 3,078,681 | 2/1963 | Zitko ....................... 61/72.6 |
| 3,408,823 | 11/1968 | Okita et al. ............... 61/72.6 |
| 3,719,158 | 3/1973 | Roths ........................ 111/2 |
| 3,817,042 | 6/1974 | Sanderson ................ 61/72.6 |
| 3,906,875 | 9/1975 | Kesinger et al. ............ 111/2 |
| 4,092,936 | 6/1978 | Griffin et al. .............. 111/1 |
| 4,132,337 | 1/1979 | Masuda et al. ............ 225/5 |
| 4,167,910 * | 9/1979 | Pretzer ...................... 111/3 |
| 4,167,911 | 9/1979 | Masuda et al. ............ 111/3 |
| 4,248,014 * | 2/1981 | Williams ................... 47/86 |
| 4,289,080 | 9/1981 | Penley ...................... 111/3 |
| 4,455,950 | 6/1984 | Pretzer ...................... 111/2 |
| 4,829,915 | 5/1989 | Ahm ....................... 111/105 |
| 4,869,637 | 9/1989 | deGroot .................. 414/404 |
| 4,886,002 | 12/1989 | Scudellaro .............. 111/102 |
| 4,888,913 | 12/1989 | Hoeft ......................... 47/9 |
| 5,165,351 | 11/1992 | Billings ................... 111/199 |
| 5,765,194 | 6/1998 | Brower et al. .......... 111/105 |
| 5,906,167 | 5/1999 | Miyachi .................. 111/200 |

OTHER PUBLICATIONS

C.W. Suggs et al., "Self–Feeding Transplanter for Tobacco and Vegetable Crops," Applied Engineering in Agriculture, vol. 3, pp. 148–152 (1987).
B.W. Maw et al., "A Seedling Taping Machine for Bare Root Plants," 1984–Transactions of the American Society of Agricultural Engineers, pp. 711–714 (1984).
Les Davis, et al., "Plant Tape Machine II," submitted to the Department of Mechanical Engineering, Louisiana State University, May 8, 1998.
(abstract) 02156813 A Jun.15, 1990.
(abstract) 09019208 A May 30, 1997.

* cited by examiner

*Primary Examiner*—Victor Batson
(74) *Attorney, Agent, or Firm*—Bonnie J. Davis; John H. Runnels

(57) ABSTRACT

An automated transplanter has been designed for seedlings previously loaded and correctly spaced on a low tensile-strength, biodegradable tape wound on a spool. The transplanter design allowed for rapid planting of the tape with the attached seedlings while minimizing the tension placed on the tape. The design linked the unspooling of the tape directly to the ground speed of the tractor and provides for an anti-backlash mechanism to prevent the spool from free-wheeling when the tractor speed slowed quickly. Using this design, synthetic seedlings attached to a low tensile-strength tape were successfully planted at speeds up to 7.5 mph.

11 Claims, 4 Drawing Sheets

HIGH-SPEED TRANSPLANTER FOR SEEDLINGS ATTACHED TO TAPE

The development of this invention was partially funded by the United States Government under a HATCH grant from the United States Department of Agriculture. The United States Government has certain rights in this invention.

This invention pertains to a machine for planting seedlings attached to a tape, particularly to one that plants the entire tape with attached seedlings at speeds up to 7.5 mph while maintaining a low tensile force on the tape.

Many crops, for example, tobacco and sweet potatoes, are best grown by growing seeds in a controlled environment and then transplanting seedlings to the field. Transplanting methods have dramatically improved in recent years, but are still labor intensive. The feeding of the seedlings into a transplanting machine resisted mechanization for a long time due to the lack of uniformity in size and shape of seedlings and problems in spacing the seedlings. See C. W. Suggs et al., "Self-Feeding Transplanter for Tobacco and Vegetable Crops," Applied Engineering in Agriculture, vol.3, pp. 148–152 (1987). The spacing of the planted seedlings often determines the yield of the crop. Even today, many transplanting methods rely on human labor to place seedlings directly into a planting mechanism and to determine the correct spacing.

The automatic feeding of seedlings to the transplanting machine has taken two tracks. One method is to grow the seedlings in containers and then to plant the individual containers with the seedlings, or to extract the seedlings from the containers before planting. See Suggs et al., 1987; U.S. Pat. Nos. 5,765,491; 4,886,002; 4,869,637; 4,289,080; 4,167,911; 4,132,337; 3,906,875; and 3,719,158. U.S. Pat. No. 4,455,950 describes a machine to plant seedlings that are initially attached to a wound tape, and that removes each seedling from the tape before planting.

A second method to automate feeding of the seedlings has been to load bare-root seedlings on a tape wound around a spool device for transplanting later. This method has several advantages over the individual container methods. Bare-root seedlings are usually cheaper to produce than plants grown in individual containers. Moreover, herbicides and fertilizers can be applied to a tape that is planted with the seedlings. Various methods have been developed for attaching the seedlings to a tape and winding the tape onto a spool. See, e.g., B. W. Maw et al., "A Seedling Taping Machine for Bare Root Plants," 1984-Transactions of the American Society of Agricultural Engineers, pp. 711–714 (1984); and U.S. Pat. No. 1,750,054.

Once the seedlings are loaded on a spool, the seedlings may be planted mechanically. One type of bare-root transplanter cuts the tape between plants before planting the seedlings. The complicated machine controls a power drive to uncoil the tape by micro sensors that sense when a plant has passed the cutters and stops the tape movement. The tape cutters move into position and cut the tape, and the seedling with a segment of tape is planted. The retraction of the cutters re-starts the uncoiling of the tape. The spacing of the planted seedlings is determined by the speed of cutting. However, this method was found to be only 70% efficient in properly spacing the plants and relatively slow. See Suggs et al., 1987.

U.S. Pat. No. 4,829,915 describes a machine to plant an intact tape loaded with seedlings by pulling the tape from a freely rotating turntable. The pulling force comes from tape already anchored in the ground. In this machine, the tape reverses direction before being planted, and has an elastic component to handle the additional tensile stress created from being pulled and from reversing direction.

U.S. Pat. No. 1,750,054 describes a machine to hold a vertical spool with seedlings loaded onto a tape. The tape is turned 90° before planting to change the orientation from horizontal to vertical and is then pulled into the furrow by an initial stake or other holding device for the tape.

Several machines have been developed to plant seed tapes loaded on a spool. See U.S. Pat. Nos. 4,092,936; 3,817,042; 3,408,823; and 3,078,681. All of these machines rely on a freely rotating turntable and pull the tape from the spool by tension from tape previously planted in the ground or anchored in some way.

U.S. Pat. No. 2,924,186 describes a hand-held seed planter that uses a guide wheel to drive the rotation of a metering roll and tape to prevent accumulation of slack at various planting speeds.

U.S. Pat. No. 5,165,351 describes an alternative embodiment that may have a drive train powered by the packing wheels that connects to the seed tape dispenser.

However, planting a seed tape presents different problems from those of planting a tape with seedlings. For example, a seed tape may be planted horizontally in the furrow, while seedlings must be planted vertically. Additionally, seedlings are more delicate, extend outside the bounds of the tape, and require more protection than do seeds.

There exists a need for a high-speed transplanter for seedlings loaded onto a tape that is relatively simple to operate with low labor costs. Preferably, the tape should be biodegradable. Previous designs that depend on pulling a tape already anchored in the ground require tape that can withstand significant tensile stress, especially at high speeds of planting. Biodegradable tapes tend to have low tensile strength. Thus, a need exists for a high-speed transplanter designed to exert low tensile stress on the tape.

Sweet potatoes are the sixth largest food crop in the world. Every part of the plant is edible, including the leaves, vine, stem, and roots. One of the reasons that sweet potatoes are not more widely grown is because the planting and harvesting process is very labor intensive. Whole sweet potatoes are planted in beds until the seedlings grow to a height of eight to twelve inches. The seedlings are then clipped one inch above ground level and are transplanted into another field. The current transplanting method is very labor intensive. Typically, a tractor pulls one to eight, one-row transplanters. Each transplanter requires two workers who ride on the transplanter and drop the individual plants into the planting mechanism. Thus an eight-row transplanter requires seventeen people, including the driver. The maximum speed for the tractor and transplanter is about 0.75 mph.

There exists a need for an automated planting system for sweet potatoes that is faster, less labor intensive, and less expensive. The time window for planting to produce optimum yield is only about 20 days long. The current transplanting speed of 0.75 mph, coupled with either wet or very dry weather conditions often cause farmers not to meet this time window. Additionally, the current planting method is labor-intensive.

More importantly, slippage and operator error in the current transplanting method often cause unevenly spaced plants, which reduces the yield. The spacing to achieve maximum yield depends on the soil conditions and the size of the potatoes desired at harvest. In south Louisiana, the desired spacing for sweet potato seedlings is about 12 inches.

We have discovered an automated transplanter suitable for use with seedlings previously loaded and correctly spaced on a low tensile-strength, biodegradable tape wound on a spool. The design allows rapid planting of the tape with the attached seedlings while minimizing the tension placed on the tape. The unspooling of the tape is linked directly to the ground speed of the tractor, with an anti-backlash mechanism to prevent the spool from "free-wheeling" when the tractor slows quickly. We have successfully planted synthetic seedlings attached to a biodegradable tape at speeds up to 7.5 mph.

BRIEF DESCRIPTION OF THE DRAWINGS

The overall design of a prototype transplanter according to the invention is schematically illustrated in FIGS. 1a and 1b. The transplanter as shown was designed so that several transplanters could be attached to a toolbar behind a tractor to allow planting of several rows. A limiting feature was the width of the transplanter, which should be less than the width between rows. As shown in FIGS. 1a and 1b the transplanter 2 included a drive train powered by a drive wheel 6, which could power several planter units 3, only one of which is shown in FIG. 1a and FIG. 1b for simplicity. The drive wheel 6 was attached to a tractor toolbar 4 by attachment arms 22. The drive train powered a conveyor system 10 which pulled the vertical tape (not shown) loaded with seedlings from the horizontal spool 8 at the same speed as the ground speed of the tractor. The spool 8 was placed on a spooling platform (not shown) which had a smaller diameter than the spool and had driving pins which matched holes in the bottom of the spool. The spooling platform was designed to have relatively frictionless rotation. The spooling platform turned on a spring-loaded spindle 20, which could be adjusted to decrease freewheeling. The spooling platform also had a rotating clutch mechanism 31 to prevent freewheeling when the tractor speed decreased. The conveyor 10 pulled the tape directly into the furrow opener 26 without changing either the orientation or direction of the tape from the spool 8. The pull of the tape turned the spooling platform. The furrow opener 26 deposited the tape in a trench at the same speed as the tractor speed. The furrow opener 26 as illustrated in FIG. 1b was a static knife system; however rotating discs could also be used to open the furrow. The packing wheels 12 then closed the soil against the tape. All the above were supported by a frame 14 which was attached to the tractor toolbar 4 by attachment plates 28. Although the best design for the delicate seedlings is to maintain them in the vertical position, the planter unit could be designed to accommodate a vertical spool with the seedlings horizontal. In such a design, the tape would have to rotate 90° before entering the conveyor.

Figure 1A:
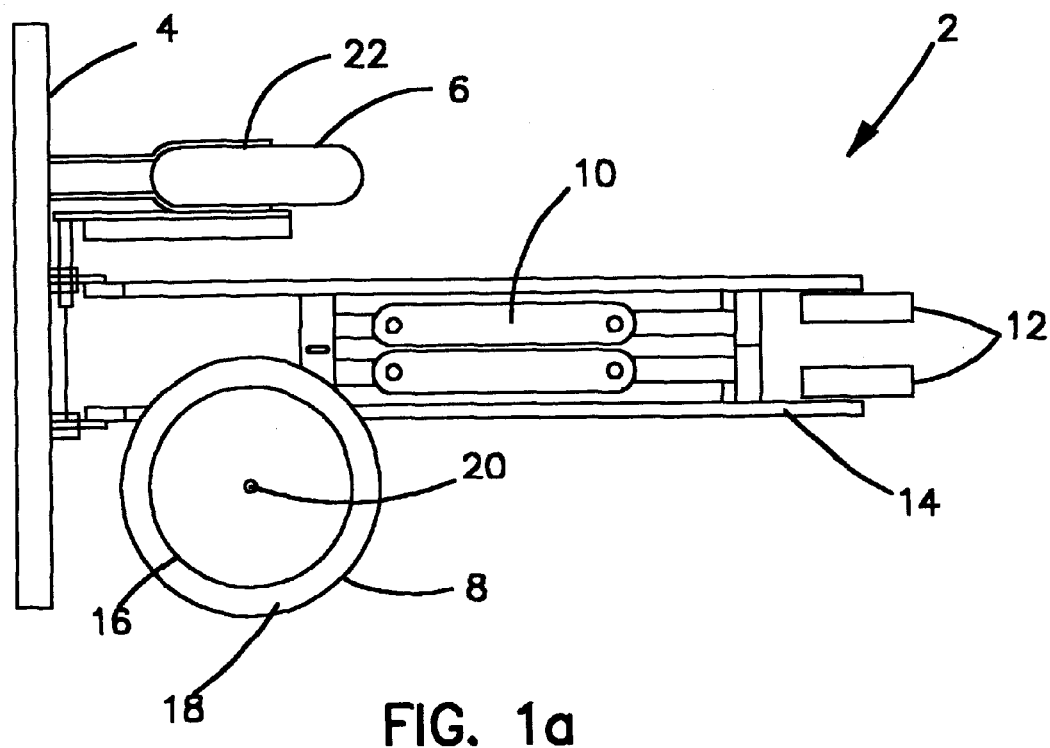
FIG. 1a illustrates the prototype transplanter model as viewed from the top.

More specifically, the unspooling assembly comprised a spool 8 around which wrap the plants and tape, as well as an assembly to support and unroll the tape. A freewheeling unspooling mechanism was chosen to minimize the tension in the tape. However, the spooling platform turned on spring-loaded spindle 20, which could be used to increase friction during unwinding of the tape if the spool spun too fast. Additionally, because the rotation of the spooling platform was designed to be controlled by the pull of conveyor 10 on the tape, the spring-loaded spindle 20 was also adjusted to overcome the friction of the rotating clutch mechanism. The design of the spool was chosen to support the weight of the sprouts at the root end, to accommodate different size plants, and to hold enough tape to span a typical field of one quarter mile. To minimize the change in diameter as the spool unwound, the inside diameter of the barrel 16 of the spool 8 was maximized within the width limit of the planter unit. Because multiple planter units are desired, the width of each planter unit is limited by the spacing between the furrows of the crop to be planted. Maximizing the inside diameter of the barrel 16 also decreased the force required to unwind the tape by turning the spool and spooling platform and thus minimized the tension applied to the tape. The diameter of the bottom flange 18 of the spool was chosen to support the roots of the plants and was determined by adding the thickness of at least one-quarter mile of plants and tape and to the barrel size. For sweet potato seedlings, the dimensions of the spool 8 were a 25-inch diameter for the barrel 16 and a 32-inch diameter for the flange 18. These dimensions could be altered for other types of seedlings. Holes were provided in the bottom of the spool to mesh with driving pins on the unspooling assembly. The spool should be made of a lightweight, economical material, for instance, plastic or fiberboard.

Because the unspooling assembly was designed to provide a relatively frictionless rotation, an inherent problem arose in case of a sudden stop, i.e., the spooling platform tended to keep unwinding due to its own inertia after the conveyor 10 stopped pulling. To regulate the speed of the spool 8 and the spooling platform as the tractor slowed while maintaining a relatively frictionless rotation, a rotating roller ramp clutch 31 was used. A clutch pulley 30 related the ground speed of the tractor with the rotational speed of the clutch. The drive train, described more extensively below, governed the speed of the outer race of the clutch through the clutch pulley 30, thereby forcing the spool 8 to unwind at the current ground speed. If the tractor slowed very quickly, the clutch abruptly halted the motion of the spooling platform. However, if the tractor slowed more gradually, the clutch engaged a series of "ticks" as it intermittently slowed and released the spooling platform in relation to ground speed. The force on the clutch as the spooling platform attempted to overrun created a small driving force on the belt in the unspooling direction, and a minor shock was absorbed by the belt. A roller ramp clutch (Warner model FS-05; Warren Electric; Warren, Mich.) was selected for this application since it behaved as a ball bearing during the normal free-wheeling operation of the spooling platform and engaged immediately as the spool tried to overrun the clutch speed. Maximum torsional stress on the clutch and the shaft occurred when the tractor suddenly stopped from maximum speed. The maximum allowable design speed for the tractor with the attached transplanter in our prototype was chosen to be eight miles per hour.

Figure 2A:
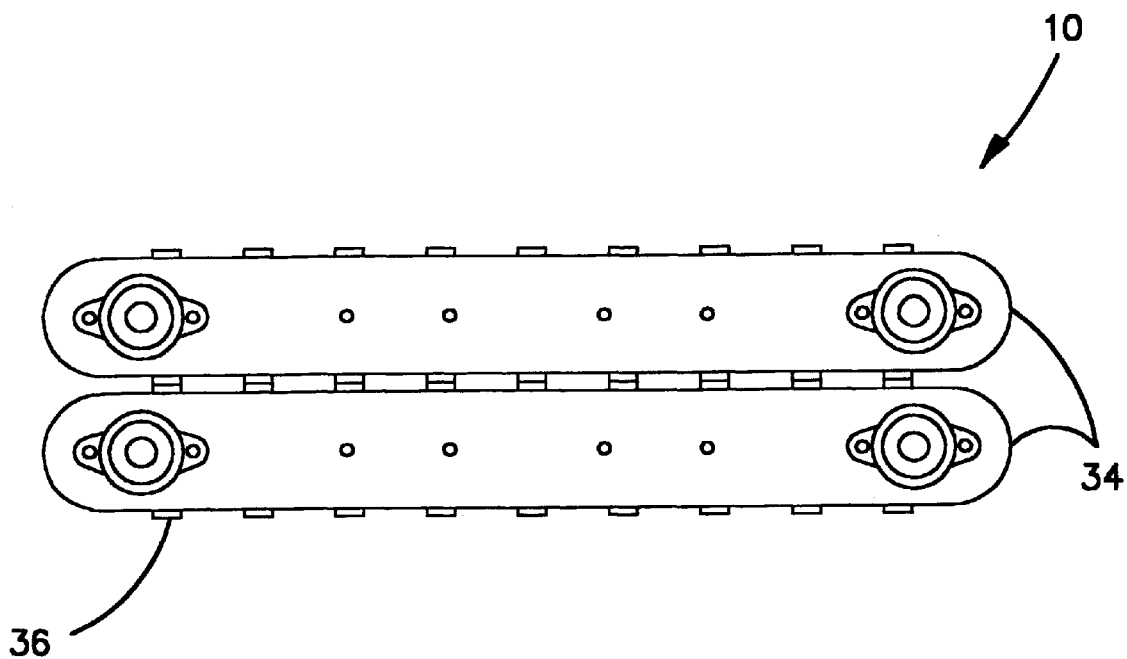
FIG. 2a illustrates the conveyor system of the prototype transplanter model as viewed from the top.
Figure 2B:
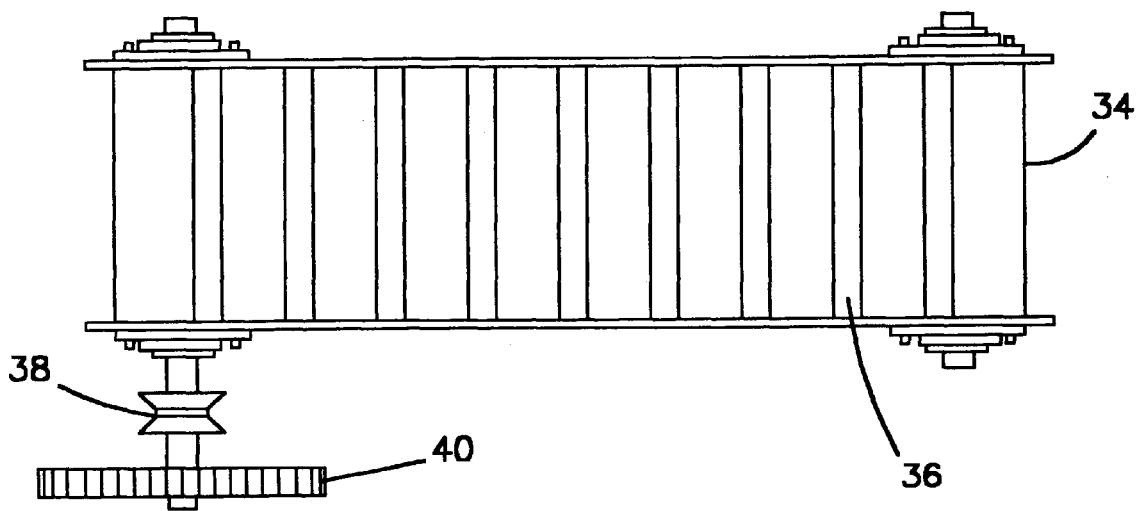
FIG. 2b illustrates the conveyor system of the prototype transplanter model as viewed from the side.

The prototype conveyor 10 was designed to delicately transport tape from the spool 8 to the ground, without damaging the seedlings. The conveyor was also designed to be "self starting," so that no human input was required to begin the planting process after the spool was placed on the spooling platform and the tape threaded between the belts of the conveyor. As shown in FIG. 2a, the conveyor 10 was made of two conveyor belts 34, in this embodiment made of thermo-plastic (polypropylene) modules (Intralox, Inc.; Harahan, La.) providing a very high strength and durability over a wide range of environments. Since the conveyor belts 34 were rigid in comparison to the plants being handled, an interlocking system of protective, soft rubber pads 36 (Series 900 Diamond Friction Belt; Intralox, Inc., Harahan, La.) were incorporated into the modular construction of the conveyor belt 34 to transfer the seedlings delicately. As shown in FIG. 2b, each belt had alternating protective pads 36 which meshed, leaving only a small space between the conveyor belts 34. These protective pads 36 were soft and pliable and did not damage delicate sweet potato seedlings. This interlocking pattern forced the tape to follow an alternating path within the conveyor 10 creating the friction needed to pull the tape without adding any undesirable compressive force. One conveyor belt 34 was powered by a conveyor pulley 38, which was driven by the drive train as described below. The conveyor pulley 38 also powered a spur gear 40 that drove a second spur gear (not shown) linked to the other conveyor belt 34 such that the two conveyor belts were driven in the same linear direction at the same speed.

Figure 1B:
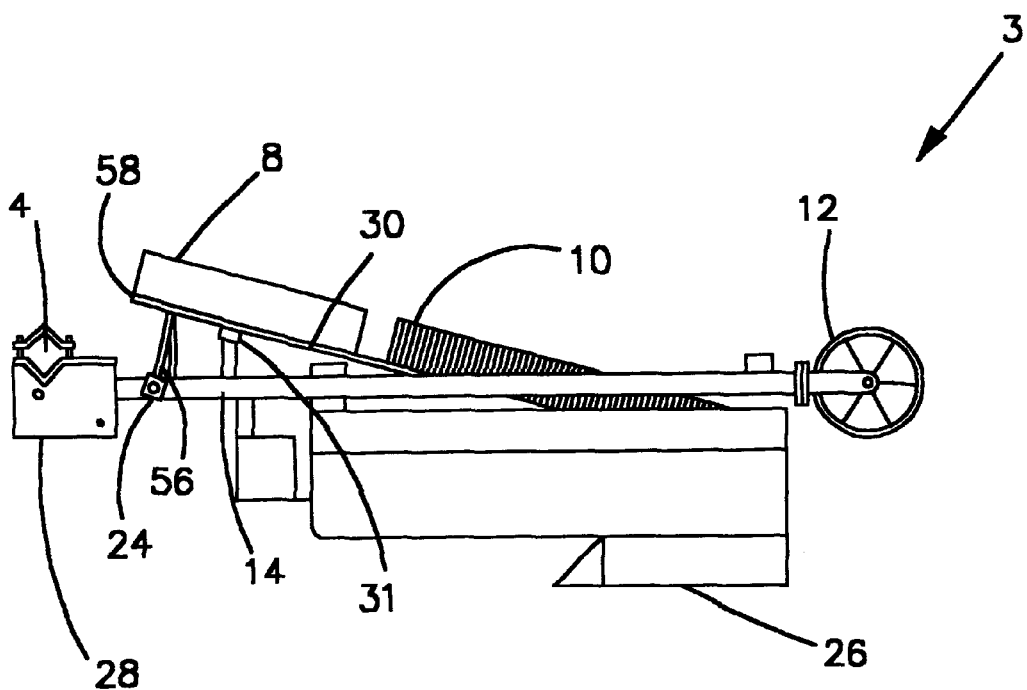
FIG. 1b illustrates a single planter unit of the prototype transplanter model as viewed from the side.

The furrow opener 26, shown in FIG. 1b, was modified to cut a groove in a furrow for the tape to be deposited. In this embodiment, the design comprised a hollow knife plow that cut a 1½ inch wide by 9.5-inch deep groove in the soil. The discharge end of the conveyor 10 was as low to the ground as possible to minimize the free length of tape between the conveyor 10 and the soil. The upper edges of the furrow opener 26 were modified to accommodate the end of the conveyor 10. The tape slid through the inside of the furrow opener 26 and was packed into the soil by the packing wheels 12 (Powell Manufacturing Company, Inc., Bennetsville, S.C.). The packing wheels 12 were mounted at a 15° angle to compact the soil around the roots and stems of the planted seedlings and to compress the soil tilled by the furrow opener 26.

The power train was designed such that the tape pulled by the conveyor 10 had a speed equal to ground speed to avoid either breaking the tape or putting slack into it. It was also designed such that the angular velocity of the pulley driving the clutch (clutch pulley 30) was slightly higher than the angular velocity of the spool 8 being unwound, allowing the spool of plants to be freely unwound during normal operation, but ensuring that the clutch would prevent the spool from overrunning ground speed.

Figure 3:
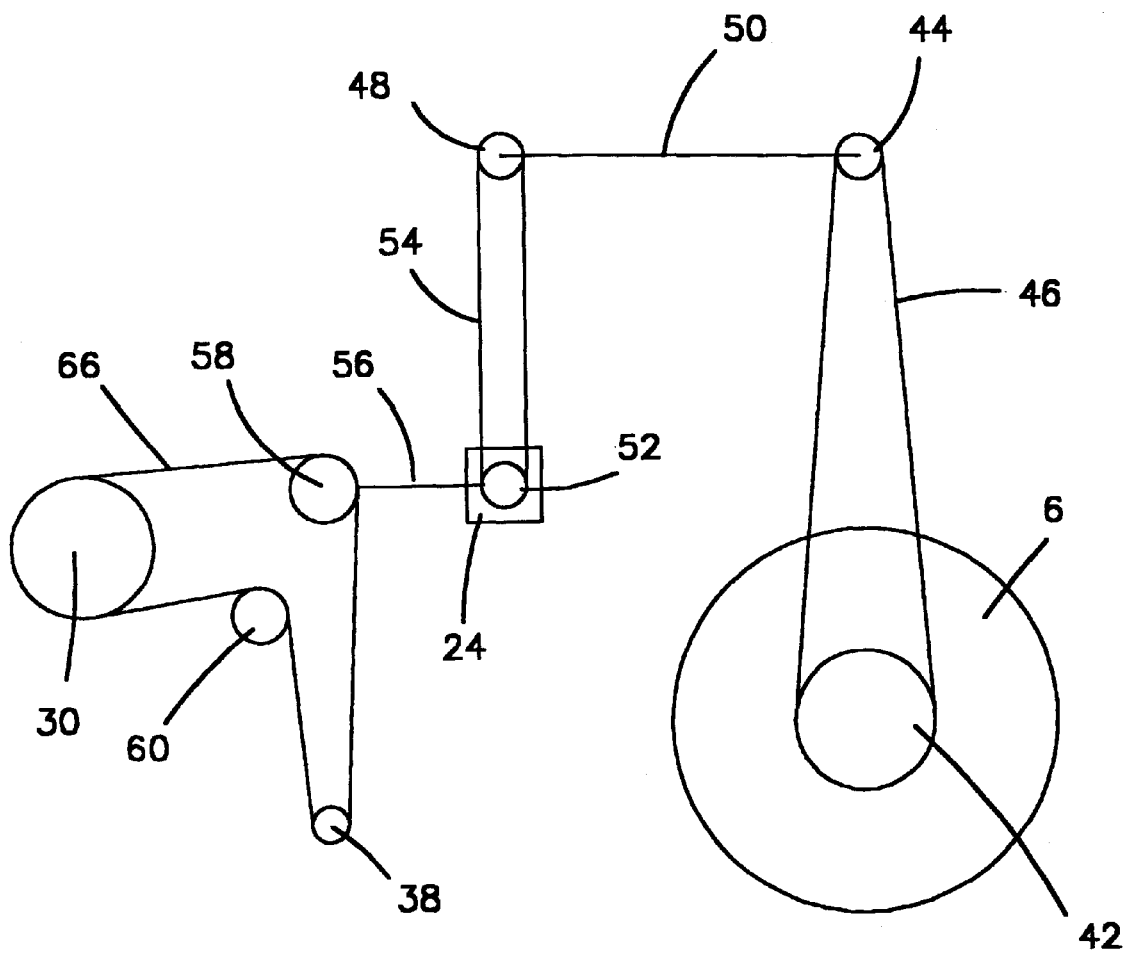
FIG. 3 illustrates the power train arrangement of the prototype transplanter model.

As shown in FIG. 1a, the prototype power train was a drive wheel 6 that could power from one to four planter units. For example, for two planter units the drive wheel 6 would be attached to the tractor toolbar 4 between the two planter units. Drive wheel 6 turned as a result of being pulled by the tractor. FIG. 3 is a schematic drawing of the power train arrangement. For clarity of illustration, all components of the power train are presented in a single plane. The drive wheel 6, which could be a standard automobile tire, was mounted on a 15-inch rim. A hub attached to the rim transferred power to the main drive sprocket 42, located on the hub axle. This main drive sprocket 42 through chain 46 drove the first toolbar sprocket 44, attached to the toolbar drive shaft 50.

The first toolbar sprocket 44 drove a second toolbar sprocket 48 through the toolbar drive shaft 50. The second toolbar sprocket 48 drove the planter sprocket 52 by a chain 54. The planter sprocket 52 was part of a right angle gearbox 24 mounted on the planter frame 14. The right-angle gearbox 24 was used to change the rotation of the drive wheel to a rotation about 25° from the vertical axis for the clutch pulley 30, tensioner pulley 60, and conveyor pulley 38. On the top of the right angle gearbox 24 was the main drive pulley 58. The main drive pulley 58 was powered by the gearbox shaft 56 driven by the planter sprocket 52. This main drive pulley 58 supplied power by way of belt 66 to the clutch pulley 30 and conveyor pulley 38. The clutch pulley 30 turned at a rotational speed of 0.04 rad/s faster than the maximum speed of the spooling platform.

The main drive pulley 58 also drove the conveyor pulley 38. The conveyor 10 unwound the spool of plants and transferred them to the opening in the ground created by the furrow opener 26. To allow for fine-tuning of the conveyor speed with respect to ground speed, a variable pitch pulley was used for the conveyor pulley 38. Another way to fine tune the pulley system would have been to use a variable pitch right angle gearbox. To allow for replacing and adjusting belt 66 and to prevent slippage of belt 66, a tensioner pulley 60 was also incorporated.

Figure 4:
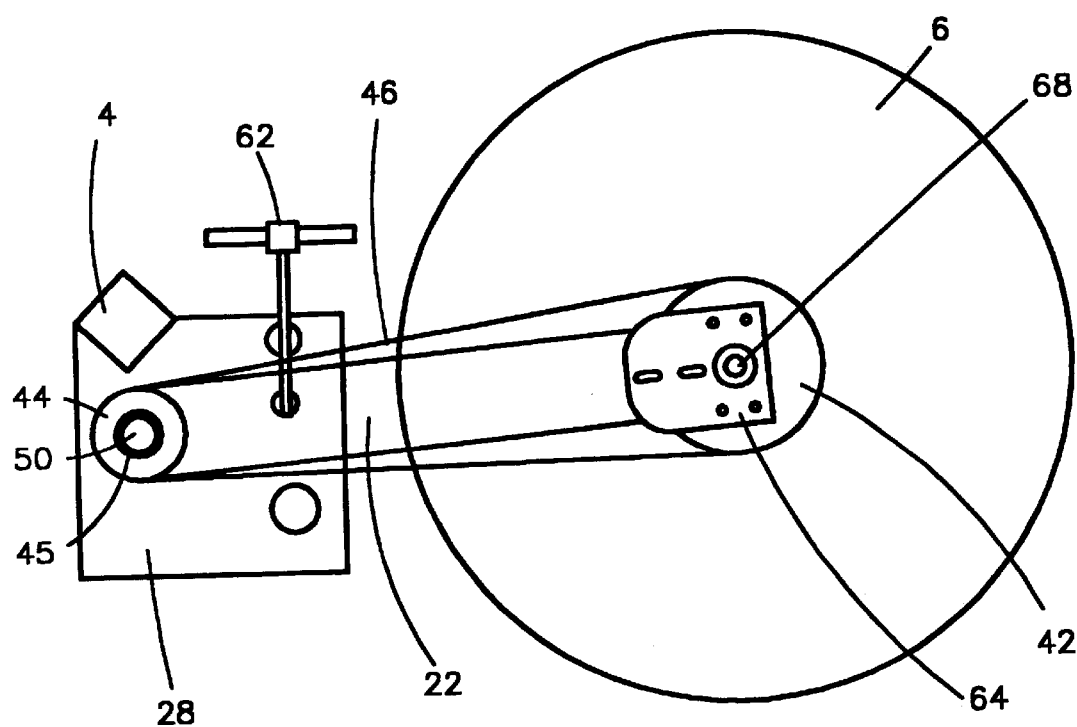
FIG. 4 illustrates the drive wheel system of the prototype transplanter model.

A general schematic of the drive wheel 6 is shown in FIG. 4. The drive tire 6 was attached to the tractor toolbar 4 by two attachment arms 22, one on each side. The attachment arms 22 pivoted on two hollow steel tubes 45 mounted to attachment plates 28 on the toolbar 4. Attached to the tire hub was the drive sprocket 42 that tranferred power through a chain 46 to the first toolbar sprocket 44 on the toolbar shaft 50. The drive wheel 6 rotates about shaft 68. To maintain a constant chain tension, the pivot for the attachment arms 22 also served as the center for the toolbar shaft 50. Adjustments were made to the vertical position of the toolbar 4 by a drive wheel height adjustment screw 62, which adjusted the height of the drive wheel 6 with respect to the toolbar 4. As the threaded crank 62 was lowered, it pushed down on the attachment arms 22, which in turn lowered the wheel 6 and raised the toolbar 4. Adjustments to the chain 46 tension were possible by sliding the drive wheel plates 64.

The frame 14 (FIG. 1a) was built to meet the following constraints. A modular construction was desired for which the planter unit was not wider than the distance between rows. In one embodiment for sweet potato seedlings, this distance was 40 inches. Sweet potatoes are typically planted on 40-inch center rows, so a modular and self-contained design narrower than 40 inches would allow for additional planter units to be assembled on the toolbar 4 of the tractor for planting multiple rows simultaneously. Additionally, the angle between the conveyor 10 discharge and the ground was minimized. In the above example, an angle of 25° was used. This small angle allowed for easy transfer of the tape into the groove cut by the furrow opener 26 while minimizing the overall length of the transplanter. Finally, a planting depth range of 4 to 6 inches was desired to ensure proper rooting of the sweet potato seedlings.

Aside from providing structural integrity, the frame 14 also provided mounting surfaces for the components of the system. The right angle gearbox 24, spooling platform, belt tensioner 60, and conveyor 10 mounts were all mounted at an angle to provide a perpendicular angle to the line of action of the belt drive system for the conveyor and clutch mechanism. In the prototype, an angle of 25° from vertical was chosen.

The transplanter was first tested with kraft paper having similar properties to a biodegradable material and tensile strength. Approximately 5 miles of this kraft paper were planted during the testing phase. To fine-tune the conveyor 10 speed to match the ground speed, a variable pitch pulley 38 with a pitch diameter adjustable from 1.8 to 2.9 inches was used.

The drive wheel 6 height was reset each time a knife 26 depth adjustment was made. With the toolbar 4 in its lowest position and the transplanter in the planting position (with knife 26 buried to set planting depth), the drive wheel height adjustment screw 62 was turned until the frame 14 was level. Once the optimal knife depth was determined, with the row height held constant, no further changes were necessary to the drive wheel height.

With an adjustment range from 12° to 22°, the packing wheels 12 were tested and an optimal angle of 15° was determined. A weight rack was built to hold up four 50-pound weights to be varied for different soil conditions. By adding weights in 50 pound increments, an optimal weight of 100 pounds was determined to produce sufficient packing in the soil conditions tested.

The transplanter as tested was capable of planting kraft paper and synthetic plants at speeds up to 7.5 mph. No plant spacing error was introduced by the transplanter because the tape was fed linearly into the furrow opening, retaining the original spacing between the seedlings on the tape. The plant spacing was determined by the spacing on the tape. The conveyor speed was adjusted to the proper rotational velocity ensuring that the tape fed at ground speed using the variable pitch conveyor pulley. The clutch anti-backlash mechanism worked properly as designed, slowing the rotation of the spool as the tractor slowed down, as well as allowing free-rotation during the planting operation.

The novel transplanter is capable of increasing planting speeds for sweet potatoes by five to ten fold. Prior mechanical transplanters operate at a top speed of 0.75 mph. The new transplanter performed well at speeds up to 7.5 mph, for example speeds at least 1 mph, 2 mph, 5 mph, and 7.5 mph.

There are many other types of crops in large-scale production such as tobacco and tomatoes that require the use of transplanters. The design of this transplanter can be easily adapted to plant other types of seedlings that can be attached to a tape.

Additionally, persons skilled in the art will recognize that the invention may be embodied in other forms without departing from its spirit or essential characteristics.

The complete disclosures of all references cited in this specification are here by incorporated by reference. Also incorporated by reference is the full disclosure of the following unpublished document: Les Davis, Brent Gros, Steve LeJeune, and Cole Mercer, "Plant Tape Machine II," submitted to the Department of Mechanical Engineering, Louisiana State University, May 8, 1998. In the event of an otherwise irreconcilable conflict, however, the present specification shall control.

We claim:

1. Apparatus for planting seedlings attached to a tape, wherein said apparatus is adapted to be attached to a tractor, and wherein said apparatus comprises:
    (a) a frame adapted to be mounted to the rear of the tractor;
    (b) a furrow opener attached to said frame and adapted to open a furrow in the ground as said frame is pulled by the tractor
    (c) a pair of packing wheels, wherein said packing wheels are mounted to said frame rearward of the furrow opener;
    (d) a drive wheel mounted to said frame and adapted to roll on the ground as the tractor moves;
    (e) a drive train powered by said drive wheel;
    (f) a rotatable turntable mounted on said frame and adapted to hold the tape of seedlings;
    (g) a clutch connected to said drive train and adapted to control the rotation of said turntable; and
    (h) two conveyor belts, wherein said conveyor belts are mounted near the turntable and are driven by the drive train at a speed equal to the speed of the tractor, and wherein said conveyor belts are adapted to pull the tape from the turntable into the furrow opener;
  wherein:
    said furrow opener is adapted to place tape entering said furrow opener into the soil at a speed equal to the speed of the tractor, and wherein the packing wheels are adapted to pack soil against the tape after the tape has been positioned in the furrow.

2. An apparatus as recited in claim 1, wherein the position of the furrow opener is adjustable relative to said frame.

3. An apparatus as recited in claim 1, wherein each of said packing wheels are adapted to be angled downwardly toward the soil opened by the furrow opener.

4. An apparatus as recited in claim 1, wherein the position of said drive wheel is vertically adjustable.

5. An apparatus as recited in claim 1, wherein said apparatus is adapted to plant seedlings attached to a tape at a tractor speeds at least 1 mph.

6. An apparatus as recited in claim 1, wherein said apparatus is adapted to plant seedlings attached to a tape at a tractor speed of at least 2 mph.

7. An apparatus as recited in claim 1, wherein said apparatus is adapted to plant seedlings attached to a tape at a tractor speed of at least 5 mph.

8. An apparatus as recited in claim 1, wherein said apparatus is adapted to plant seedlings attached to a tape at a tractor speed of at least 7.5 mph.

9. Apparatus for planting seedlings attached to a tape, wherein said apparatus is adapted to be attached to a tractor, and wherein said apparatus comprises:
    (a) a frame adapted to be mounted to the rear of the tractor;
    (b) a furrow opener attached to said frame and adapted to open a furrow in the ground as said frame is pulled by the tractor
    (c) a pair of packing wheels, wherein said packing wheels are mounted to said frame rearward of the furrow opener;
    (d) a drive wheel mounted to said frame and adapted to roll on the ground as the tractor moves;
    (e) a drive train powered by said drive wheel;
    (f) a rotatable turntable mounted on said frame and adapted to hold the tape of seedlings;
    (g) a regulator connected to said drive train and adapted to slow and stop the rotation of said turntable as the tractor speed slows and stops; and
    (h) two conveyor belts, wherein said conveyor belts are mounted near the turntable and are driven by the drive train at a speed equal to the speed of the tractor, and wherein said conveyor belts are adapted to pull the tape from the turntable into the furrow opener;
  wherein:
    said furrow opener is adapted to place tape entering said furrow opener into the soil at a speed equal to the speed of the tractor, and wherein the packing wheels are adapted to pack soil against the tape after the tape has been positioned in the furrow.

10. Apparatus for planting seedlings attached to a tape, wherein said apparatus is adapted to be attached to a tractor, and wherein said apparatus comprises:

(a) a frame adapted to be mounted to the rear of the tractor;

(b) a furrow opener attached to said frame and adapted to open a furrow in the ground as said frame is pulled by the tractor;

(c) a dispenser attached to said frame and adapted to place the tape in the furrow opened by the furrow opener; and (d) a regulator attached to said frame and to said dispenser, wherein said regulator is adapted to control the speed at which the dispenser places tape in the furrow to match the speed at which the tractor moves across the ground.

11. Apparatus as recited in claim 10, wherein:

(a) said dispenser comprises a rotatable turntable adapted to hold the tape wound around a spool; and (b) said regulator controls the rotation rate of said turntable, so that said turntable dispenses the tape at a speed that matches the speed of the tractor as the tractor moves across the ground, and said regulator retards the rotation rate of said turntable as the speed of the tractor slows, so that the turntable does not dispense the tape at rate substantially faster than the speed of the tractor, even if the tractor's speed slows or stops suddenly.

* * * * *